Patented May 26, 1936

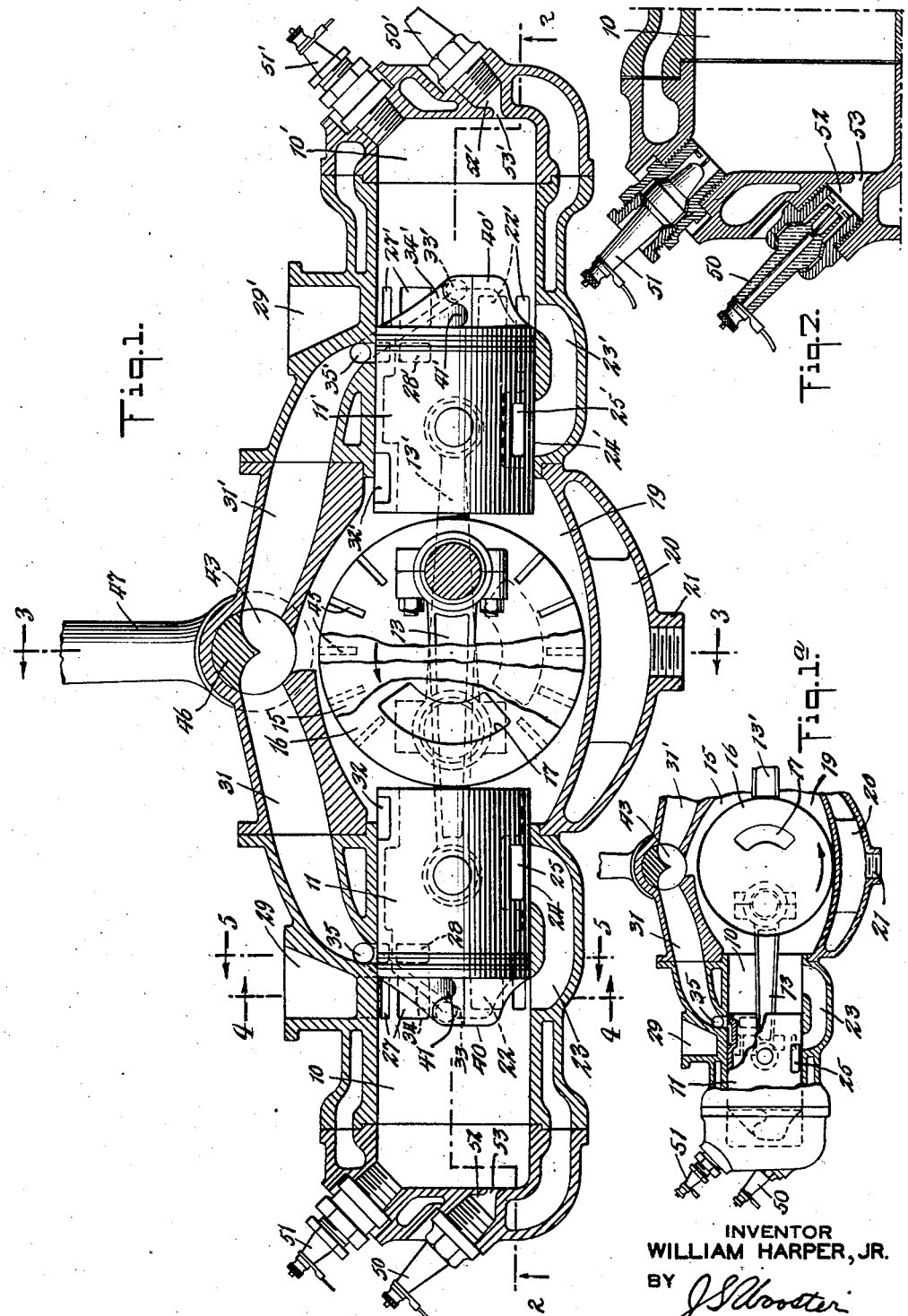

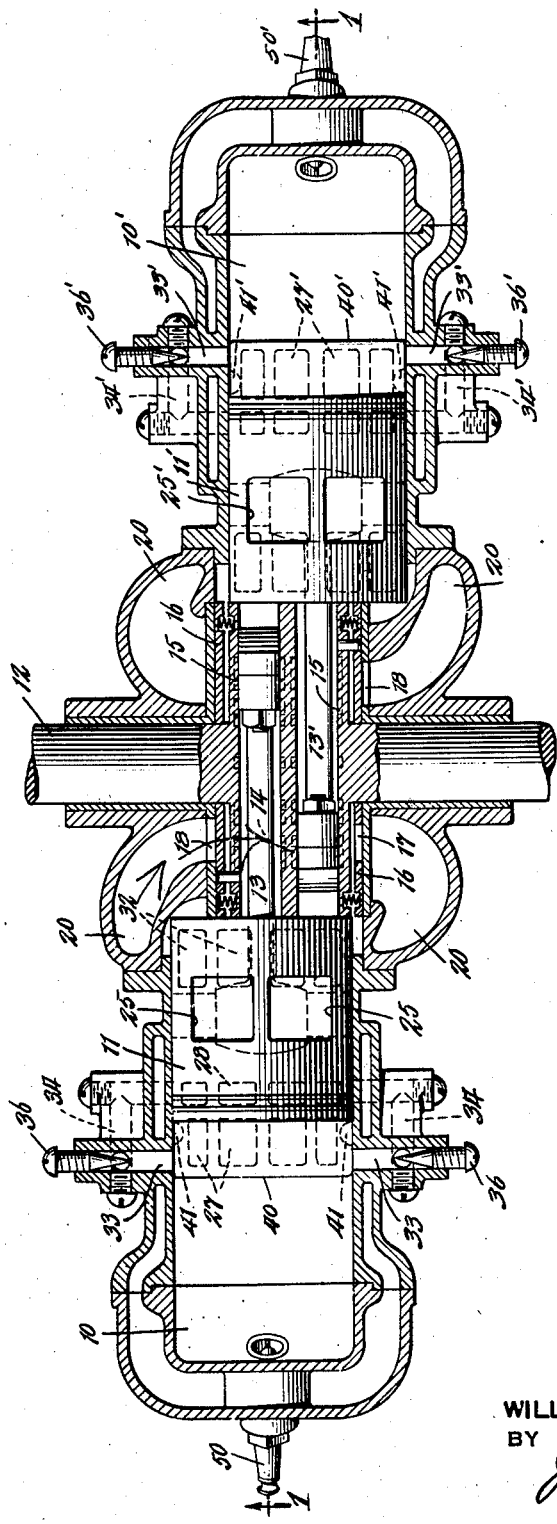

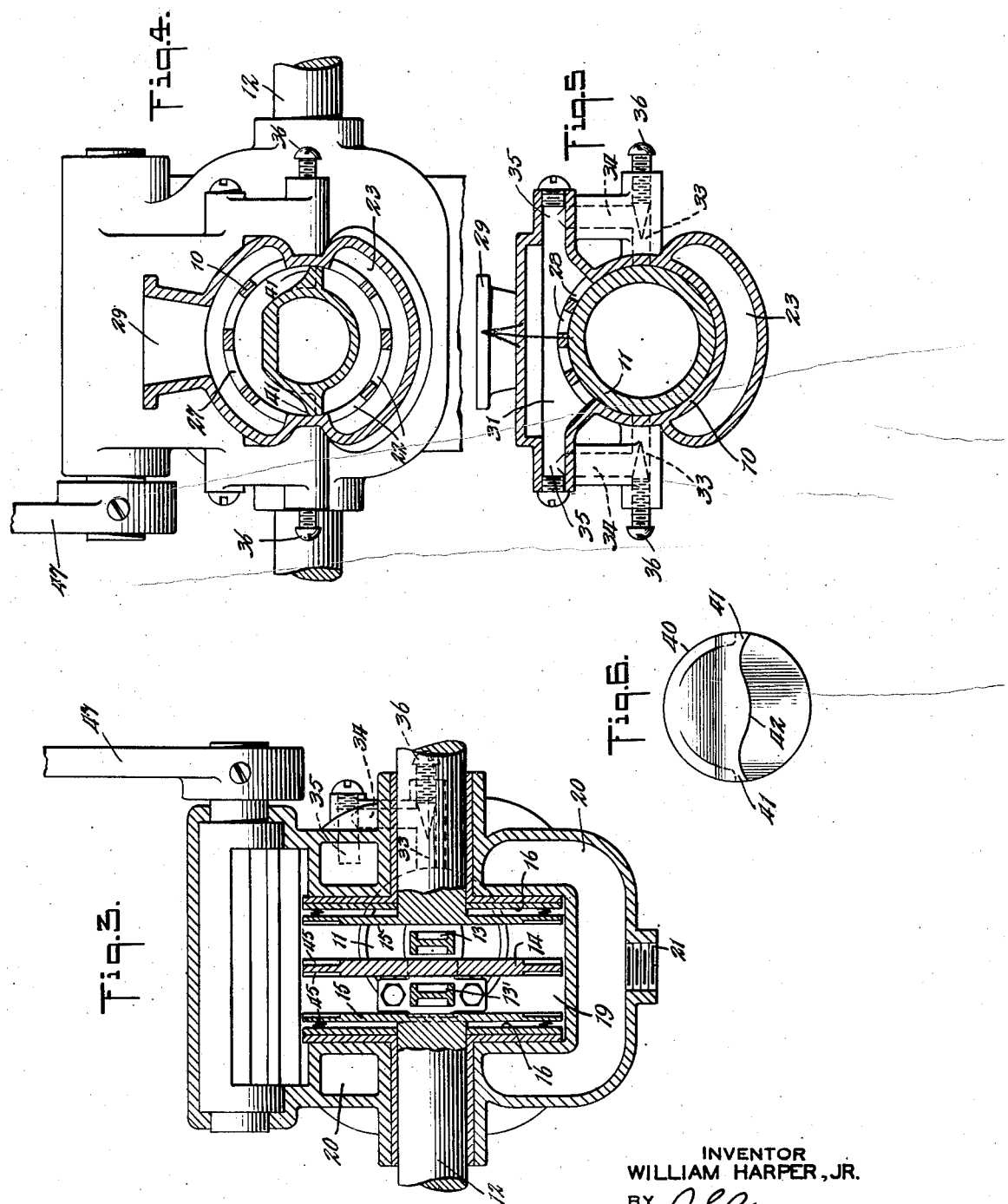

2,041,708

UNITED STATES PATENT OFFICE 2,041,708

COMBUSTION ENGINE

William Harper, Jr., Port Washington, N. Y., assignor to H. B. Motor Corporation, a corporation of New York Application January 20, 1931, Serial No. 509,947

15 Claims. (Cl. 123—56)

This invention relates to combustion engines and has particular reference to method and means for supercharging an engine to increase the volumetric efficiency, together with various improvements in structural combinations for practicably carrying the invention into effect, and has further reference to method and means for preventing loss of charge in an engine having inlet and exhaust ports open at the same time.

According to this invention the charge to be compressed in a combustion space, whether carbureted mixture or air into which the liquid fuel will be injected after compression in the combustion space, is supplied to the combustion space under superatmospheric pressure, to thereby increase the volumetric efficiency and hence the power output of an engine having a given displacement. While it is known that supercharging a combustion space under positive or superatmospheric pressure will increase the volumetric efficiency, the common means heretofore provided of external blowers or pumps is unsatisfactory, besides increasing the overall weight of the engine and, moreover, such external blowers or pumps consume power and thereby reduce the overall efficiency of the engine. It is an object of this invention to provide supercharging means operated by high pressure exhaust in such a way as not to contaminate the fresh charge with burned exhaust gas. The invention further contemplates means whereby the exhaust gas is scavenged out of the supply system after it has performed its function of building up the supply pressure at the time of charging into the combustion space. The combustion space shown herein is in the form of a conventional two-cycle cylinder with inlet and exhaust ports controlled by a movable explosion driven member such as a piston, but in its broad aspect the invention is not confined to such conventional types as the engine shown.

In carrying out the invention I provide a charging reservoir in which fluid, either air or carbureted mixture, is maintained under pressure, which is herein specifically shown as by crank case compression effected by the piston. To build up such reservoir pressure so as to accomplish superatmospheric pressure charging of the combustion space within the limited time permitted in modern high duty engines, part of the explosion pressure when at or about its maximum is discharged against a column of charging fluid for the next working stroke so as to build up the reservoir pressure and discharge it into the combustion space as soon as the inlet thereto is opened. In the form shown, this inlet is opened by continued inward travel of the piston, but of course may be opened and controlled by known types of cam actuated inlet valves in the conventional manner. The preliminary charging exhaust is connected with the fluid pressure reservoir in any desired manner, and as herein specifically shown, is connected thereto by an escapement port in the cylinder which is uncovered by the piston in advance of the piston uncovering the main exhaust, which latter in a conventional two-cycle engine occurs somewhat before the end of the inward piston stroke.

The invention, either in conjunction with supercharging or independently thereof, prevents loss of charge in an engine having inlet and exhaust ports open at the same time. This is accomplished by charging the combustion space and then injecting gas into the combustion space adjacent the exhaust port and against the charge before closing the exhaust port, whereby the injected gas passes out through the exhaust port and bucks the fresh charge away from said port. In the form shown, the injected gas is high pressure exhaust gas which is trapped from a preceding explosion and is injected back into the combustion space. The explosion driven member or piston head is shaped to direct this returned gas out through the exhaust port before said port is closed during the compression stroke.

The invention also includes means for cutting the supercharging effect in and out as may be desirable according to operating conditions, and various detailed improvements and combinations, all of which will be more fully understood in connection with the description of the accompanying drawings, wherein:

Fig. 1 is a sectional elevation on the line 1—1 of Fig. 2, showing a two-cycle opposed cylinder engine with pistons at the end of the working stroke;

Fig. 1a, is a similar but fragmentary view showing the position of the parts at the end of the compression stroke.

Fig. 2 is a longitudinal section taken on the line 2—2 of Fig. 1;

Fig. 3 is a transverse section through the crank case, taken on the line 3—3 of Fig. 1;

Fig. 4 is a transverse section on the line 4—4 of Fig. 1;

Fig. 5 is a transverse section on the line 5—5 of Fig. 1;

Fig. 6 is a plan view of the piston head; and

Fig. 7 is a sectional view showing the preferred construction and arrangement of spark plugs.

The two-cycle engine shown in the drawings has a pair of opposed cylinders 10, 10' with reciprocating pistons 11, 11' connected to a common crank shaft 12 by means of connecting links 13, 13' and crank disc 14.

The inner flanges 15 of the crank shaft are keyed to rotatable discs 16 provided with the usual arcuate slots 17 adapted to register with inlet ports 18 in the crank case 19. The inlet ports 18 communicate with the inlet duct 20 receiving gas from the nozzle 21 connected to the carburetor in the usual manner.

Except for a special ribbed construction of the crank discs, which I shall refer to later, the parts so far described are well known in the art. Inasmuch as the construction and operation are the same for both cylinders, I shall confine the following description to the cylinder 10 and associated parts at the left hand side of Figs. 1 and 2. Corresponding parts associated with cylinder 10' will be given similar reference numerals with primes affixed thereto.

Cylinder 10 has a bank of inlet ports 22 in position to be opened and closed by the piston 11. These inlet ports connect with a by-pass channel 23 the other end of which terminates in ports 24 opening into the lower end of the cylinder. The ports 24 are adapted to register with inlet ports 25 in the piston for a purpose hereinafter described.

Banks of exhaust ports 27 and 28 are located in the cylinder wall on the side opposite the inlet ports. The main exhaust ports 27 communicate with the exhaust manifold 29, and are adapted to be opened and closed by the piston 10. The exhaust ports 28 open into an elongated supercharging chamber 31, as best shown in Fig. 5, and at times are made to communicate with the main exhaust ports 27 through the medium of by-pass grooves 32 in the piston.

An important feature of the invention resides in the small escapement ports 33 which are drilled at opposite points in the cylinder 10. The position of these small ports which are preferably of much smaller area than the main exhaust ports 27, is such that they open about the same time as, or slightly ahead of, the ports 27. The ports 33 are connected to ducts 34 which open at 35 into the end of gas chamber 31. The ports 33 contain cone-shaped screws or valves 36 which may be adjusted to vary the size of the opening between the ports 33 and the ducts 34 for a purpose hereinafter described.

The piston head has a nozzle-shaped extension 40 which is shaped to provide shallow scallops or grooves 41 adjacent the cylinder wall and separated by a deflector 42, whereby the ports 33 are opened by the passing of the scalloped surface of the piston for a short period at the beginning of exhaust and closed as the piston crosses bottom dead center. The ports 33 are also opened again by grooves 41 for an instant as the piston starts up on the compression stroke.

When the ports 33 are opened at the point of exhaust some high pressure gas passes into ducts 34 and enters the end of chamber 31 at 35. The chambers 31 and 31' have previously been filled with fresh gas, admitted to the crank case through inlet ports 17, 18 and thence directed into the chambers 31 and 31' through restricted port 43 by the centrifugal pressure developed by the crank discs. The sudden admission of high pressure gas at 35 and 35' produces a ramming effect on the column of fresh gas contained in chambers 31, 31' forcing it into the crank case through the outlet or port 43 which is shaped to direct the charge into the crank case. At this time, the piston having moved further down the stroke and the exhaust pressure having been relieved through the main exhaust ports 27, and the piston having then uncovered the inlet ports 22, the total crank case charge of fresh gas is then transferred to the working cylinder through by-pass 23. This charge has an initial pressure sufficient to overcome the back pressure remaining in the cylinder, which can be controlled by the relative height of the escapement ports 33. It will be seen that the elongated supercharging chambers 31 and 31' are so shaped that the incoming burnt gas, admitted through ports 35 and 35' at the opposite ends of the chambers, is not diffused into the fresh gas, but acts as a ram against the whole column of fresh gas.

As the cylinder is then more than completely filled with fresh gas, there is a tendency for this fresh gas to leak out of exhaust ports 27. However, this condition is prevented since, when the piston starts upward the ports 33 are again opened by grooves 41, and as a greater pressure still remains in the ducts 34 than in the working cylinder, some of the exhaust gas in these ducts comes back into the working cylinder through ports 33. The nozzle shaped deflector between grooves 41 causes this exhaust gas to spread out, and directs it so that it passes out the main exhaust ports 37 instead of fresh gas while the piston starts its upward or compression stroke.

Upon the piston completing its upward or compression stroke, the by-pass groove 32 in the piston opens a passage between the chamber 31 and the exhaust ports 27 and 28. This allows the burnt gas which is then in the chamber 31 to be passed out through exhaust ports 27 due to suction in the exhaust passage resulting from the inertia of a preceding charge passing out ahead. This action is also promoted by the pressure of the inlet gases from the crank case which is increased by vanes or ribs 45 which I provide on the sides of the crank discs preferably beyond the radius of ports 17, 18 as shown in Figs. 1 and 3; and may be further promoted by additional pressure derived from external supercharging.

A cylindrical valve 46 is operated in the port 43 by means of a lever 47 so as to cut out the supercharging effected by chambers 31 and 31' when desired, or when starting up the engine. While this valve cuts out the supercharging it still leaves the exhaust gases to oscillate in the ducts 34, 34' and the scalloped piston head to prevent the loss of fuel through exhaust ports 27 and 27'. When supercharging is not desired, supercharging chambers 31 and 31' may be dispensed with and the outer ends of ducts 34 and 34' closed or else valve 46 may be closed permanently so that chambers 31 and 31' will trap high pressure exhaust gas after each explosion and return said gas to the cylinders after they are charged as previously described. A further balancing adjustment of the amount of supercharging is attained by means of the screws 36, 36' as best shown in Fig. 2. By withdrawing these cone-pointed screws a greater amount of pressure is used. Valve 46 is preferably curved as shown in Fig. 1 to direct the gas in chambers 31, 31' downwardly through port 43 into the crank case when the valve is opened.

The ignition system includes two or more spark plugs set at a draining angle in the head of each cylinder as shown in Figs. 1 and 7. One or more of these plugs 50 is specially selected for its good insulating properties and preferably has a so-called petticoat porcelain insulator which is a good high tension insulator, while the other plug or plugs 51 has any other suitable type of insulator constructed more for rapid heat dissipation. The plug 51 has its spark gap extending well into the combustion chamber of the cylinder head, the plug preferably bisecting the upper edge of the cylinder head whereby the ignition from this plug will spread instantly throughout the entire compressed charge. The plug 50, however, is shielded in a recess 52 having a restricted orifice 53 formed by an overhanging lip on the wall of the cylinder head which intercepts most of the radiant heat from the combustion in the cylinder since the plug 50, having the type of insulator illustrated, would become excessively hot if mounted in a more exposed position. In the preferred form of the invention the orifice 53 is set at such an angle that its entrance is adjacent the water-jacketed wall of the cylinder, this being the region of the combustion chamber where the radiant heat is at a minimum.

It is evident that ignition from the plug 50 will not be as rapid as from plug 51. If the plug 51 is fouled when the engine is started, then the plug 50 which sparks simultaneously with plug 51 will ignite the charge while warming up the engine until plug 51 has become hot enough to burn off the oil or carbon which has caused the fouling. Although no one plug has yet been designed to combine the advantages of good electrical insulation and good heat dissipation, these advantages are effectively combined in the two or more plugs described above.

Scavenging of recess 52 is accomplished automatically due to the position of plug 50 in said recess and to the high compression ratio in the cylinder which is about ten to one in the engine illustrated. After each explosion the pressure in recess 52 drops to the same point as the pressure in the cylinder and most of the exhaust gas flows out of said recess. On the following compression stroke, the compressed fresh mixture forces the residual exhaust gas in recess 52 back to the base of the plug. The points of the spark gap are close enough to orifice 53, and the clearance back of the points is sufficient, to allow such residual exhaust gas to be pushed back away from the points on each compression stroke.

I have illustrated the invention in its application to a two-cycle opposed cylinder engine without, of course, limiting it to that particular type of engine. It will also be evident that numerous other changes may be made in the details of construction shown and described without departing from the scope and spirit of the invention as defined in the appended claims.

The words "charge" and "fluid" as used in the claims mean either a carbureted mixture or air into which the liquid fuel will be injected after compression in the combustion space, and "fluid pressure reservoir" means any suitable reservoir for carbureted mixture or air under pressure.

The invention claimed is:

1. A combustion engine comprising a cylinder having inlet and exhaust ports, a piston adapted to open and close said ports, a fluid pressure reservoir adapted to communicate with said inlet port in one position of the piston, means for injecting exhaust gas from the cylinder into said reservoir in a predetermined position of the piston to supercharge said cylinder, and a by-pass groove in the piston adapted to connect said reservoir with the exhaust port in the cylinder to discharge exhaust gas from said reservoir.

2. A combustion engine comprising a cylinder having inlet and exhaust ports, a piston adapted to open and close said ports, a fluid pressure reservoir adapted to communicate with said inlet port in one position of the piston, means for injecting exhaust gas from the cylinder into said reservoir in a predetermined position of the piston to supercharge said cylinder, a by-pass groove in the piston adapted to connect said reservoir with the exhaust port in the cylinder, and means for blowing the exhaust gas in said reservoir through the by-pass groove and exhaust port.

3. A combustion engine comprising a crank case, a crank shaft, a crank disc connected to the crank shaft, a cylinder having inlet and exhaust ports, a piston connected to said crank disc and adapted to open and close the ports in the cylinder, a supercharging chamber connected to said crank case, a pair of opposite escapement ports in the cylinder connected to said supercharging chamber and adapted to be uncovered in a predetermined position of the piston to inject exhaust gas into said supercharging chamber, a by-pass groove in the piston adapted to connect the supercharging chamber with the main exhaust port to relieve the supercharging chamber of exhaust gas, and vanes on the crank disc to blow the exhaust gas from the supercharging chamber.

4. A combustion engine comprising a cylinder having inlet and exhaust ports, a piston adapted to open and close said ports, a fluid pressure reservoir adapted to communicate with said inlet port in one position of the piston, spaced escapement ports in the cylinder, ducts connecting said escapement ports to said reservoir to admit high pressure exhaust gas thereto, a by-pass groove in the piston adapted to connect the reservoir with the main exhaust port to withdraw burnt gas from said reservoir, and an extension on the piston head having grooves adapted to uncover the escapement ports at the beginning of exhaust and at the beginning of the compression stroke and a deflector on the piston head between said grooves adapted to direct exhaust gas from said ducts toward the main exhaust port.

5. A combustion engine comprising a crank case, a crank shaft, a crank disc connected to the crank shaft, a pair of opposed cylinders supported by the crank case and having inlet and exhaust ports, pistons connected to said crank disc and adapted to open and close the ports in the cylinders, connected supercharging chambers opening into the crank case, means for connecting the inlet ports in the cylinders with the crank case in one position of the pistons, spaced escapement ports in each cylinder adapted to be uncovered in predetermined positions of the pistons, ducts connecting the escapement ports of the respective cylinders to opposite ends of said supercharging chambers to admit high pressure exhaust gas thereto, and by-pass grooves in the pistons adapted to connect the supercharging chambers with the main exhaust ports in the cylinders to relieve the supercharging chamber of exhaust gas.

6. A combustion engine comprising a crank case, a crank shaft, a crank disc connected to the crank shaft, a pair of opposed cylinders supported by the crank case and having inlet and exhaust ports, pistons connected to said crank disc and adapted to open and close the ports in the cylinders, connected supercharging chambers having an opening at their juncture leading into the crank case, a valve controlling said opening, means for connecting the inlet ports in the cylinders with the crank case in one position of the pistons, spaced escapement ports in each cylinder, grooves in the piston heads adapted to uncover said escapement ports at the beginning of the exhaust and at the beginning of the compression stroke, ducts connecting the escapement ports of the respective cylinders to opposite ends of said supercharging chambers to admit high pressure exhaust gas thereto, means for varying the effective area of said ducts to vary the pressure of the gas passing therethrough, by-pass grooves in the piston adapted to connect the supercharging chambers with the main exhaust ports in the cylinders to relieve the supercharging chambers of exhaust gas, and vanes on the crank disc to blow the burnt gas from the gas chambers.

7. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, means for discharging exhaust gas from said reservoir, and an accelerating blower in said reservoir.

8. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, means for discharging exhaust gas from said reservoir, and a centrifugal blower in said reservoir.

9. A combustion engine comprising a cylinder, a piston, inlet and exhaust means, a fluid pressure reservoir adapted to communicate with said inlet to charge said cylinder, an escapement port in said cylinder having a duct connected to said reservoir and adapted to be uncovered by said piston to discharge high pressure exhaust gas against said fluid to supercharge said cylinder, and means for throttling said duct to vary the pressure of said exhaust gas on said fluid.

10. A combustion engine comprising a cylinder having inlet and exhaust ports, a piston, a fluid pressure reservoir adapted to communicate with said inlet ports to charge said cylinder, spaced escapement ports in said cylinder of less area than said exhaust port, ducts connecting said escapement ports to said reservoir to admit high pressure exhaust gas thereto, and throttling means adjacent said escapement ports for varying the pressure of the gas passing therethrough.

11. A combustion engine comprising a cylinder having inlet and exhaust ports, a piston adapted to open and close said ports, a fluid pressure reservoir adapted to communicate with said inlet port to charge said cylinder during the working stroke of said piston, spaced escapement ports in said cylinder adapted to be uncovered in predetermined positions of said piston, ducts connecting said escapement ports to said reservoir, said piston containing grooves arranged to uncover said escapement ports during the inward stroke to discharge high pressure exhaust gas against the fluid in said reservoir and at the beginning of the outward stroke to permit the return of exhaust gas from said ducts to said cylinder, and means controlled by said piston to connect said reservoir with said exhaust port near the end of the outward stroke to discharge residual exhaust gas from said reservoir.

12. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, a supercharging chamber having a restricted opening communicating with said crank case, means for admitting high pressure exhaust gas to said supercharging chamber to supercharge said cylinder, means for discharging exhaust gas from said supercharging chamber, and a blower in said crank case to accelerate charging of said cylinder and discharging of said exhaust gas from said supercharging chamber.

13. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, a supercharging chamber connected to said crank case, spaced escapement ports in said cylinder connected to said supercharging chamber and adapted to be uncovered by said piston to admit high pressure exhaust gas to said supercharging chamber and to permit the return of exhaust gas from said supercharging chamber to said cylinder, means controlled by said piston for expelling said returned exhaust gas through said exhaust port, and means controlled by said piston to connecting said supercharging chamber with said exhaust port to discharge residual exhaust gas from said supercharging chamber.

14. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, a supercharging chamber connected to said crank case, spaced escapement ports in said cylinder connected to said supercharging chamber and adapted to be uncovered by said piston to admit high pressure exhaust gas to said supercharging chamber and to permit the return of exhaust gas from said supercharging chamber to said cylinder, means controlled by said piston for expelling said returned exhaust gas through said exhaust port, means controlled by said piston for connecting said supercharging chamber with said exhaust port to discharge residual exhaust gas from said supercharging chamber, and a blower in said crank case actuated by said crank shaft.

15. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for simultaneously opening said inlet ports to said crank case to charge said cylinders, an elongated supercharging chamber having a restricted central opening communicating with said crank case and shaped to direct a charge into said crank case, means for admitting high pressure exhaust gas to opposite ends of said supercharging chamber to supercharge said cylinders, means for discharging said exhaust gas from said supercharging chamber, and a blower in said crank case actuated by said crank shaft to accelerate charging of said cylinders and discharging of said exhaust gas from said supercharging chamber.

WILLIAM HARPER, Jr.